United States Patent [19]
Ledford et al.

[11] Patent Number: 5,706,318
[45] Date of Patent: Jan. 6, 1998

[54] RECTANGULAR ABSORBER TUBE FOR A CONTROL ROD IN A NUCLEAR REACTOR

[75] Inventors: Kevin L. Ledford; James E. Holden; Richard D. Wittmeier; Justin L. Banks; Mark C. Clark, all of Wilmington, N.C.

[73] Assignee: General Electric Company, Schenectady, N.Y.

[21] Appl. No.: 655,889

[22] Filed: May 31, 1996

[51] Int. Cl.⁶ .................................................. G21C 7/10
[52] U.S. Cl. ...................................... 376/327; 376/333
[58] Field of Search ................................ 376/327, 333

[56] References Cited

U.S. PATENT DOCUMENTS

| | | | |
|---|---|---|---|
| 2,917,444 | 12/1959 | Dreffin | 376/327 |
| 3,407,117 | 10/1968 | Lichtenberger | 376/327 |
| 4,861,544 | 8/1989 | Gordon | 376/333 |
| 4,902,470 | 2/1990 | Dixon et al. | 376/333 |
| 4,980,535 | 12/1990 | Aiello et al. | 219/121.63 |
| 5,034,185 | 7/1991 | Uedo et al. | 376/333 |

FOREIGN PATENT DOCUMENTS

| | | | |
|---|---|---|---|
| 0337736 | 10/1989 | European Pat. Off. | 376/327 |
| 0338772 | 10/1989 | European Pat. Off. | 376/327 |
| 4120917 | 12/1966 | Japan | 376/327 |
| 0220893 | 11/1985 | Japan | 376/333 |
| 1079692 | 3/1989 | Japan | 376/327 |
| 1148995 | 6/1989 | Japan | 376/327 |
| 1148998 | 6/1989 | Japan | 376/327 |
| 1158390 | 6/1989 | Japan | 376/327 |
| 4006493 | 1/1992 | Japan | 376/327 |

*Primary Examiner*—Harvey E. Behrend
*Attorney, Agent, or Firm*—Nixon & Vanderhye P.C.

[57] ABSTRACT

A control rod for a nuclear reactor incorporates a plurality of neutron absorber tubes containing neutron absorbing materials. The absorber tubes are substantially rectangular inside and outside, each tube containing at least one axial stack of substantially round neutron absorbing material segments or capsules.

12 Claims, 4 Drawing Sheets

RECTANGULAR ABSORBER TUBE FOR A CONTROL ROD IN A NUCLEAR REACTOR

TECHNICAL FIELD

This invention relates to a control rod for a nuclear reactor and specifically, to an improved rectangular shape for the absorber tubes within the control rod.

BACKGROUND

Control rods are employed in nuclear reactors to perform dual functions of power distribution and reactivity control. Power distribution in the core is controlled during the operation of the reactor by manipulation of selected patterns of rods which enter from the bottom of the reactor core. Each control rod in its power distribution function may experience a similar or a very different neutron exposure than other control rods in the control system. Control rods are generally cruciform in cross section and typically comprise a plurality of absorber tubes extending axially in each wing of the rod. In one design, the tubes are filled with boron carbide powder and seal-welded at their ends with end plugs. The powder is separated into sections or segments. In another design, the tubes are filled with capsules of discrete lengths containing boron carbide powder. In other words, a plurality of stainless steel capsules are stacked in each tube with the tubes lying side-by-side in each wing of the control rod, generally in parallel with the long axis of the rod. These capsules or segments, for example, may have lengths of one foot or more.

Conventional control rods use "square" absorber tubes to contain the neutron absorbing materials. These "square" tubes are, in fact, round but are provided with four lobes at opposite corners to allow tube-to-tube welding. It is these lobes which give the tube a "square" appearance. The interior of each tube is round, and round hafnium rods and/or round boron carbide capsules are loaded into the tubes. During operation, the boron carbide capsules release helium gas and expand diametrically. The gas release and the imposed expansion exerts loads on the tube wall which limit the mechanical capability of the design.

The mechanical limit for the blade or wing design is based on the internal pressure and the induced strain in the absorber tube. Internal pressurization may cause the absorber tube to rupture, while the induced strain may cause material corrosion to occur. The current square tube design has equal length and equal thickness ligaments between tube lobes. With this design, the loads distribute themselves fairly equally about the tube circumference. Thus, failure due to pressure can occur on any of the four tube ligaments or sides, while failure due to corrosion can occur only on the two exterior ligaments or sides exposed to the reactor environment.

DISCLOSURE OF THE INVENTION

In accordance with this invention, a rectangular absorber tube is provided, with protrusions or lobes which allow an array of tubes to be welded together in panel form, in a manner generally similar to the earlier described "square" tubes. The internal shape of the tube, however, is also rectangular, with a predetermined aspect ratio. The different length (or height) and width dimensions, where the interior ligaments have length dimensions greater than the width dimensions of the exterior ligaments, causes preferential loading of the interior ligaments between tubes during operation because the internal capsules are closer to the interior ligaments than to the exterior ligaments. The four ligaments which make up the walls of the tube also have different thicknesses and are spaced differently to further impact on the preferential failure mode. Specifically, the longer tube walls or ligaments between adjacent tubes are thinner than the exterior width ligaments exposed to the reactor coolant. Therefore, pressure induced failure would preferentially occur only in the two ligaments between the adjacent tubes, unlike the "square" design where pressure induced failure can occur in any of the four tube ligaments. In addition, the rectangular internal shape also increases the volume within the tube, which in turn reduces pressurization rate. It is, of course, understood that the two interior ligaments between adjacent tubes are exposed to an environment which is less severe than the reactor environment, and since the two exterior ligaments which are exposed to the reactor environment now experience reduced strain, the probability of operationally limiting failure mechanisms is significantly reduced.

It will also be appreciated that the aspect ratio of the interior rectangular shape can be tailored to limit the amount of failure risk assumed in the design. This can be controlled by the amount of gap between the capsule diameter and the tube or ligament width. The preferential design allows the height to be larger than the maximum capsule growth, such that no strain is induced into the tube wall exposed to the reactor coolant. The width can be sized to have little or no gap, and thus, capsule expansion may load adjoining ligaments. Since the internal tube walls or ligaments will only be exposed to an inert environment, strain as a driving function for corrosion induced failure of control rods can be essentially eliminated.

Accordingly, in its broader aspects, the present invention relates to a control rod for a nuclear reactor which incorporates a plurality of neutron absorber tubes containing neutron absorbing materials, the improvement wherein the neutron absorber tubes are substantially rectangular, each tube containing at least one axial stack of substantially round neutron absorbing material segments.

In another aspect, the invention relates to a control rod for a boiling water nuclear reactor comprising a cruciform shaped control rod body including four wings, each of which extends perpendicular to an adjacent wing, and wherein each wing includes a plurality of substantially rectangular neutron absorber tubes welded together in panel form, each tube loaded with a plurality of substantially cylindrical neutron absorber material segments.

Other objects and advantages of the subject invention will become apparent from the detailed description which follows.

BEST MODE FOR CARRYING OUT THE INVENTION

Figure 1:
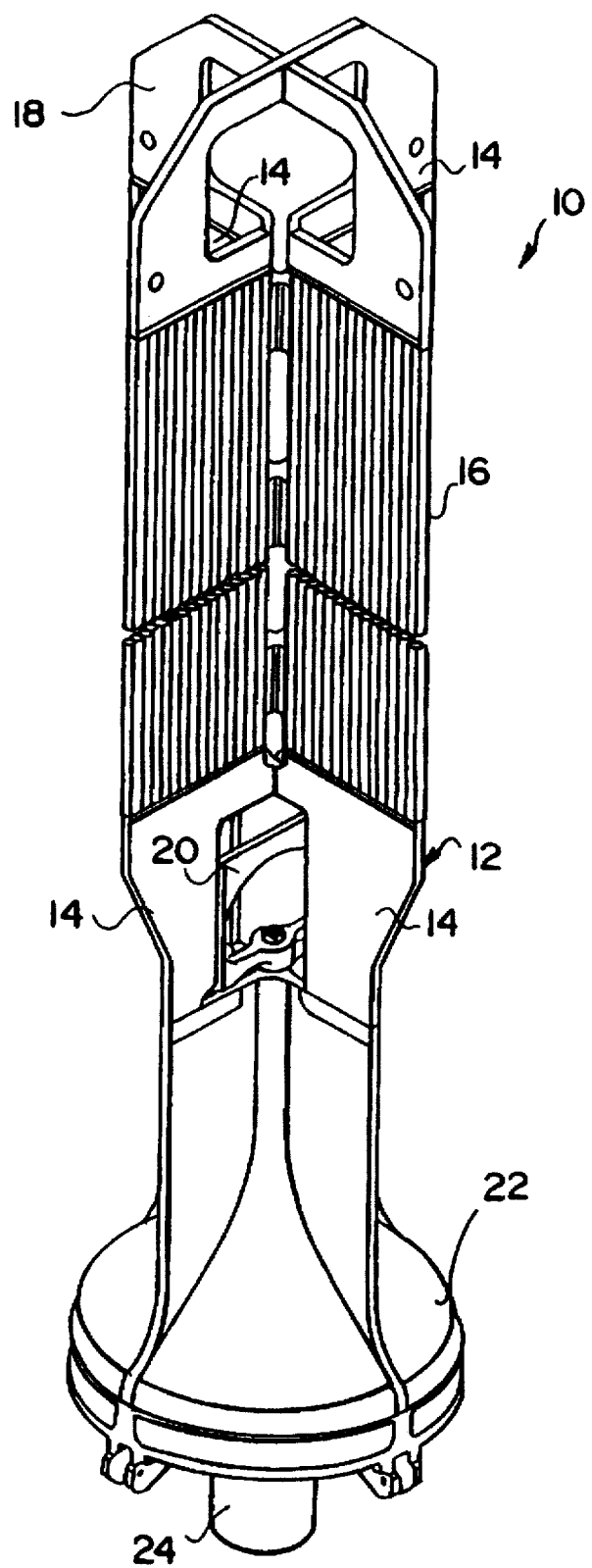
FIG. 1 is a perspective view of a control rod for a nuclear reactor.

Referring now the drawings, and particularly to FIG. 1, there is illustrated a control rod assembly 10 of conventional construction. The control rod assembly includes a generally cruciform control body 12, with each wing 14 of the cruciform shaped body 12 including a plurality of elongated absorber tubes 16 extending substantially parallel to the longitudinal axis of the control rod in side-by-side relationship. The control rod assembly 10 also includes a handle 18, a coupling release handle 20 and a velocity limiter 22 along with a coupling socket 24. It will be appreciated that the control rod is adapted for insertion between fuel channels containing fuel bundles arranged in quadrants, such that the perpendicularly related wings 14 of the control rod lie adjacent the corresponding sides of a fuel channel.

The neutron absorber tubes 16 contain neutron absorbing material in the form of round hafnium rods and/or round boron carbide filled capsules. Typically, the capsules are stainless steel and contain boron carbide material in powder form, while the upper end of the absorber tube may be closed by a short rod formed of another neutron absorbing material, i.e., hafnium. The individual capsule segments may be of the same or different lengths and preferably have uniform loadings of neutron absorbing material, although non-uniform loadings may also be employed.

Figure 2:
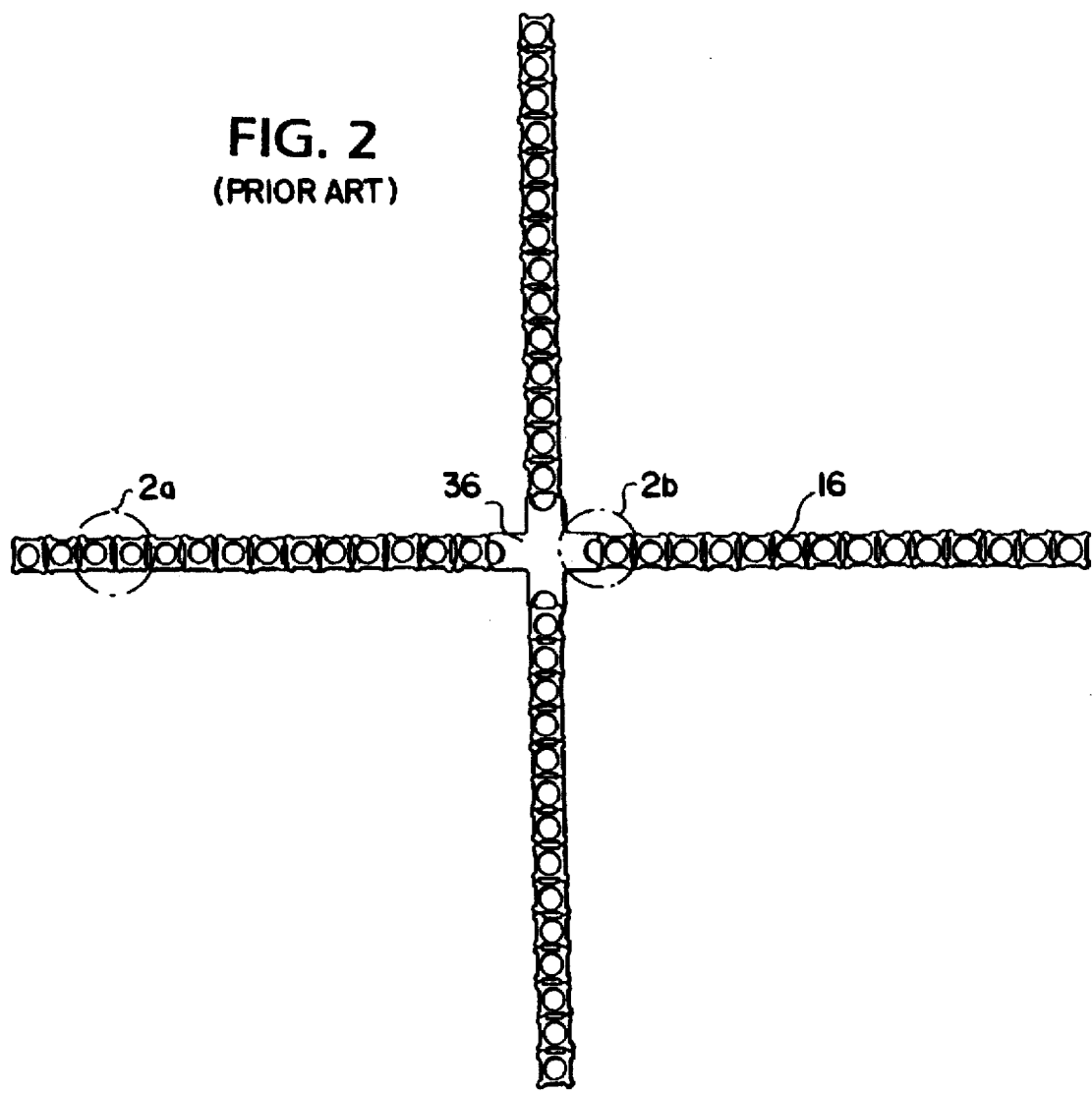
FIG. 2 is a partial section through the control rod illustrated in FIG. 1.
Figure 2A:
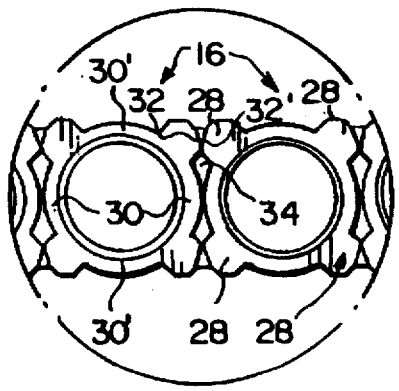
Figure 2B:
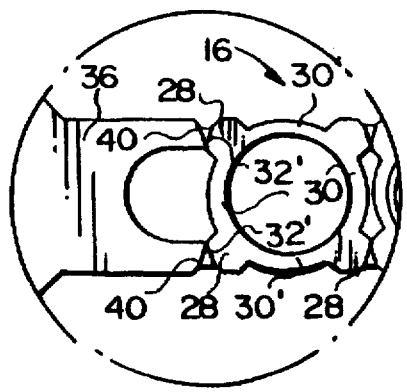

Turning now to FIG. 2, and particularly to enlarged details 2a and 2b, the conventional absorber tube 16 is essentially round, but it is formed to include four equally spaced exterior projections or lobes 28 which impart to the external shape of the tube, a substantially "square" shape. The four lobes 28 are interconnected by ligaments 30, 30' of substantially identical length and thickness. The absorber tube 16 has a round interior space which is filled with similarly shaped boron carbide filled capsules and/or hafnium rods. Adjacent absorber tubes 16 are welded together at corresponding lobe surfaces 32, 32', leaving a closed space 34 between adjacent absorber tubes. At the center core 36 of the control rod, an absorber tube 16 is welded to the adjacent core projection 38 as best seen in the enlarged detail 2b. Thus, the lobe surfaces 32' are welded to similarly shaped surfaces 40 provided on the projection 38. An example of this type of absorber tube construction may be found in commonly owned U.S. Pat. No. 4,861,544.

As noted above, because the ligaments between the tube lobes are substantially identical in both length and thickness, internal loads exerted on the tube walls or ligaments as a result of gas release are distributed substantially equally about the tube circumference. As a result, failure due to pressure can occur on any of the four ligaments while failure due to corrosion can occur only in the two exterior ligaments 30' which are exposed to the reactor environment.

Figure 3:
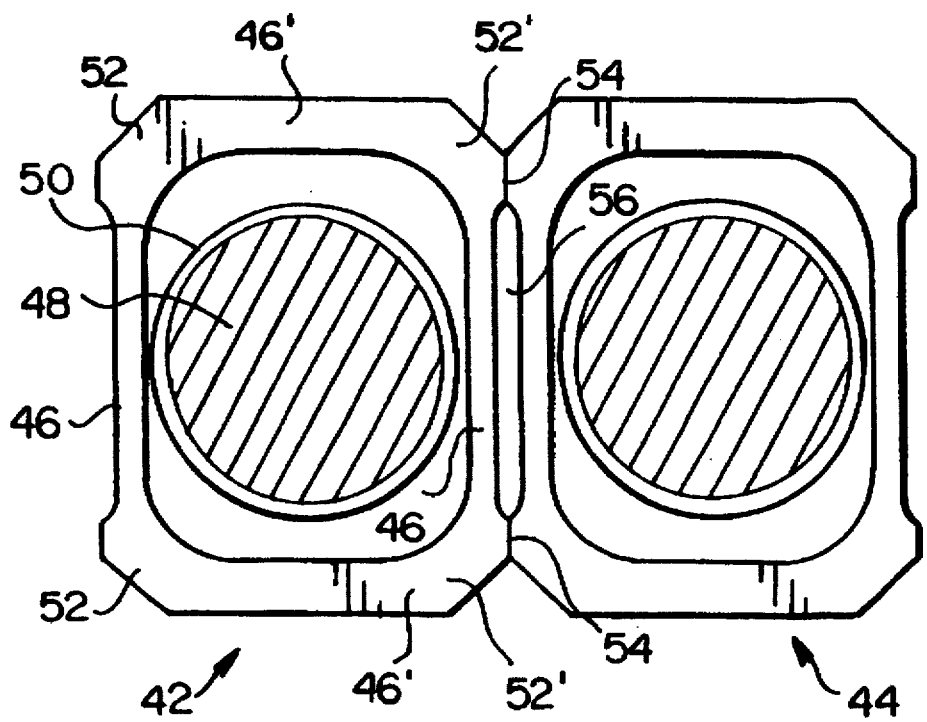
FIG. 3 is an enlarged section of two adjacent absorber tubes incorporating the subject matter of this invention.
Figure 4:
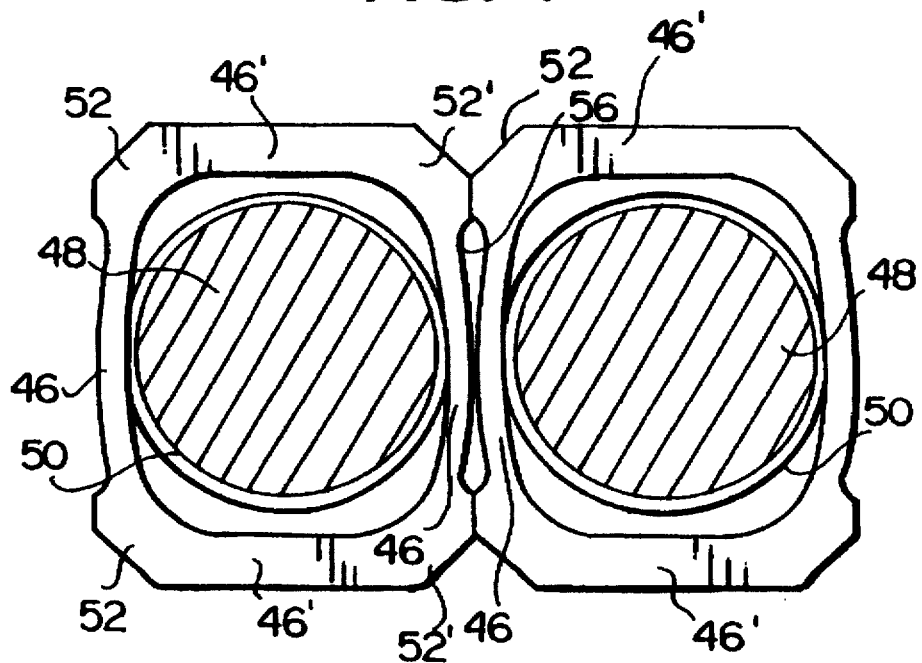
FIG. 4 is a section view similar to claim 3, but illustrating tube deformation after capsule growth.
Figure 5:
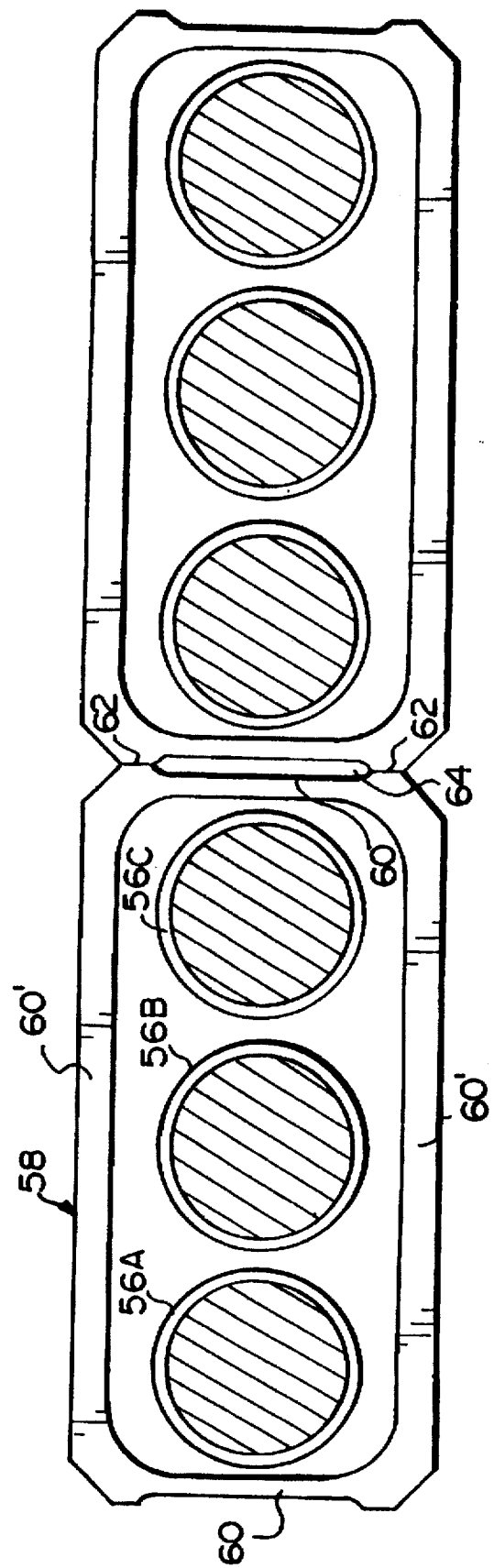
FIG. 5 is a partial section illustrating adjacent multiple capsule absorber tubes in accordance with another embodiment of the invention.

Turning now to FIGS. 3–5, improved absorber tubes are illustrated in accordance with this invention. With specific reference to FIG. 3, adjacent absorber tubes 42, 44 are each shown to have a substantially rectangular shape, with interior cross sectional length or height ligaments 46 interconnecting exterior width ligaments 46'. Not only is the cross section height of ligaments 46 greater than the cross section width of ligaments 46', it is a further feature of the invention that ligaments 46 have thicknesses which are less than corresponding thicknesses of the width ligaments 46'. In addition, with a centrally located absorber material 48 (enclosed by capsule 50) centrally located with the tube 42, i.e., along the longitudinal axis of the tube, it will be appreciated that the gaps between the capsule 50 and the width ligaments 46', is greater than corresponding gaps between the capsule 50 and height ligaments 46.

Each absorber tube 42 and 44 is provided with exterior lobes 52, 52', respectively, which are adapted to engage along flush surfaces 54 where the adjacent tubes are welded together. With the two tubes welded together as shown in FIG. 3, a closed space 56 is formed between the adjacent tubes 42 and 44. This space, as well as the space within the tube surrounding the absorber material capsule 50, is filled with helium.

With reference now to FIG. 4, because the gap in the width dimension of the tube between the absorber material capsules and the interior walls of the tubes is fairly small, capsule expansion during operation loads the adjoining relatively thinner ligaments as shown in FIG. 4. Since the internal tube walls, i.e., those walls which engage adjacent tube walls, will only be exposed to an inert environment, any induced strain in the internal walls of the structure cannot act as a driving function for corrosion induced failure of control rods. Moreover, since the thicker ligaments which are exposed to the more severe reactor environment have reduced strain in that capsule growth has no effect on the thicker ligament walls, the probability of operationally limiting failure mechanisms is significantly reduced.

As previously mentioned, the aspect ratio of the interior space within the tubes can be varied so as to, for example, increase or decrease the gap between the capsule 50 and the height ligaments 46 and/or width ligaments 46' to thereby vary the failure risk built into the design.

Turning now to FIG. 5, and in an alternative embodiment of the subject invention, multiple stacks of absorber material rods or capsules are loaded side by side within a single rectangular absorber tube. Significantly, a plurality (e.g., three) of stacks of neutron absorber segments or capsules 56A, 56B and 56C are enclosed within a single, rectangular absorber tube 58. The tube 58 includes relatively thinner and shorter height ligaments 60, and relatively thicker but longer width ligaments 60'. The tube is welded at flush surfaces 62 to an adjacent similiarly configured tube, with a closed space 64 therebetween. Here again, the aspect ratio can be altered to provide the desired gaps adjacent the interior ligaments 60 as well as the exterior ligaments 60' as described hereinabove. This arrangement has benefits similar to those described above with respect to FIGS. 3 and 4. It will be appreciated that the invention here extends to other configurations which incorporate the features of the invention as described herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope oil the appended claims.

What is claimed is:

1. In a control rod for a nuclear reactor which incorporates a plurality of neutron absorber tubes in side-by-side relationship containing neutron absorbing materials, the improvement wherein said neutron absorber tubes are substantially rectangular in both exterior and interior cross-section, each tube containing at least one axial stack of substantially round neutron absorbing material segments, and wherein each absorber tube has two parallel relatively thicker walls and two parallel relatively thinner walls, said segments being located substantially along a longitudinal axis of said absorber tube and closer to said relatively thinner walls than to said relatively thicker walls, and wherein said relatively thinner walls of adjacent absorber tubes face each other.

2. The improvement of claim 1 wherein each said substantially rectangular absorber tube has an internal cross sectional height dimension greater than an internal cross sectional width dimension, and wherein said substantially round capsule has an outer diameter smaller than said cross sectional width dimension.

3. The improvement of claim 1 wherein said relatively thinner walls include a pair of exterior projections adapted to engage with a similar pair of exterior projections on an adjacent absorber tube such that a closed space is formed between said relatively thinner walls of adjacent absorber tubes.

4. The improvement of claim 3 wherein said absorber tube and said capsule are sized such that capsule growth causes said capsule to engage and outwardly deform only said relatively thinner walls.

5. The improvement of claim 1 wherein each absorber tube is formed with exterior projections at each of four corners of said absorber tube, said projections including flush surfaces adapted for flush engagement with corresponding surfaces of one or more adjacent tubes.

6. The improvement of claim 5 wherein adjacent tubes have a closed space therebetween, said closed space accommodating expansion of said relatively thinner walls.

7. The improvement of claim 5 wherein space surrounding said capsule within the absorber tube is filled with helium.

8. The improvement of claim 3 wherein said closed space is filled with helium.

9. A control rod for a boiling water nuclear reactor comprising a cruciform shaped control rod body including four wings, each of which extends perpendicular to an adjacent wing, and wherein each wing includes a plurality of substantially rectangular neutron absorber tubes welded together in panel form, each tube loaded with a plurality of substantially cylindrical neutron absorber material segments, and wherein each absorber tube has two parallel relatively thicker walls and two parallel relatively thinner walls, said segments being located substantially along a longitudinal axis of said absorber tube and closer to said relatively thinner walls than to said relatively thicker walls, and wherein said relatively thinner walls of adjacent absorber tubes face each other.

10. The control rod of claim 9 wherein each said substantially rectangular absorber tube has an internal height dimension greater than an internal width dimension, and wherein said substantially round capsule has an outer diameter smaller than said width dimension.

11. The control rod of claim 9 wherein said relatively thinner walls include a pair of exterior projections adapted to engage with a similar pair of exterior projections on an adjacent absorber tube such that a closed space is formed between said relatively thinner walls of adjacent absorber tubes.

12. The control rod of claim 9 wherein each absorber tube is formed with exterior projections at each of four corners of said absorber tube, said projections including flush surfaces adapted for flush engagement with corresponding surfaces of one or more adjacent tubes.

* * * * *